T. KOHN.

Device for Finishing Thread.

No. 8,301. Reissued June 25, 1878.

Witnesses.

Wilmot Horton

Geo. D. Jewell

Inventor.

Tobias Kohn by Theo. G. Ellis, Attorney

THE NORRIS PETERS CO., PHOTO-LITHO., WASHINGTON, D. C.

UNITED STATES PATENT OFFICE.

TOBIAS KOHN, OF HARTFORD, CONNECTICUT.

IMPROVEMENT IN DEVICES FOR FINISHING THREAD.

Specification forming part of Letters Patent No. 48,958, dated July 25, 1865; Reissue No. 8,301, dated June 25, 1878; application filed December 8, 1877

*To all whom it may concern:*

Be it known that I, TOBIAS KOHN, of Hartford, in the county of Hartford and State of Connecticut, have invented certain new and useful Improvements in Devices for Finishing Thread; and I do hereby declare that the following is a full, clear, and exact description thereof, whereby a person skilled in the art can make and use the same, reference being had to the accompanying drawings, and to the letters of reference marked thereon.

Like letters in the figures indicate the same parts.

Figure 1:
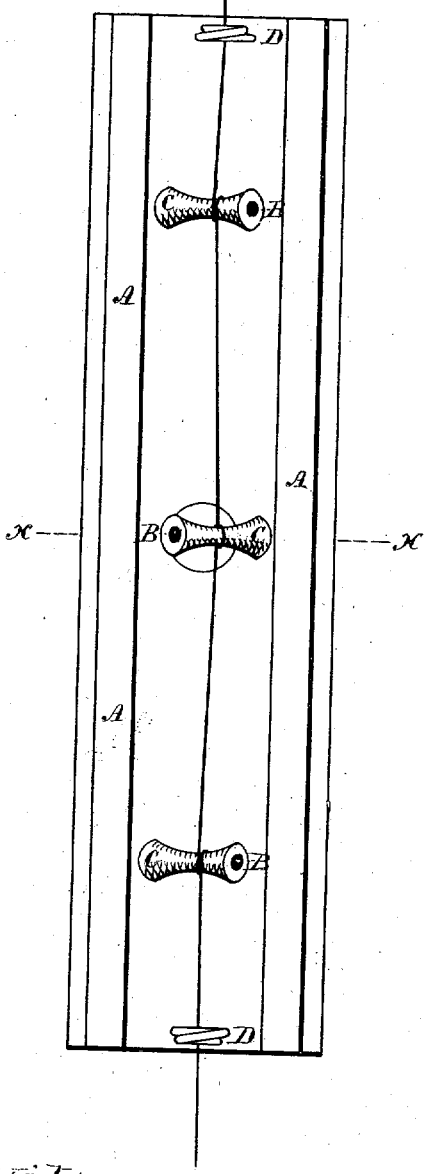
Figure 2:
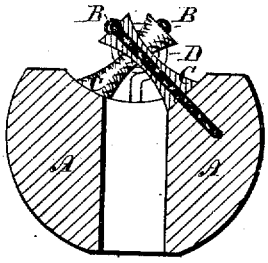

Figure 1 is a plan of my improved devices. Fig. 2 is a transverse section on the line *x x* of Fig. 1.

My invention relates to machines for cleaning and finishing silk and other threads, in which the fuzz or loose projecting fibers upon the surface of the unfinished thread is removed by friction and by the rolling of the thread in contiguous coils upon a roller, whereby a smooth and finished appearance is given to it.

My invention consists in the peculiar form of the roller, hereinafter described, and in the arrangement and position of a series of rollers upon the frame of the machine.

A is a carriage, forming part of the machine. It is provided with pins B, which are inserted in such a manner as to cross each other, viewing the device from the end, or in the transverse section shown in Fig. 2. On these pins are loose rollers C, of a concave shape, which turn freely by the action of the thread which is wound around them, when a longitudinal motion is given to the carriage A.

The thread is passed through the guides D at each end, and is wrapped around each roller of the series, as shown in Fig. 1. The thread being thus placed in position, the carriage is reciprocated longitudinally by any suitable means, the effect of which is to wear off, wear down, or pull out the loosely-projecting fibers, by which additional finish and beauty are obtained.

I am aware that the method of finishing yarns and other threads than silk by means of rollers is not new, as the same has been done by cylindrical rollers, and by means of a large needle operated by hand; but in my improvement the faces of the rollers are concave, so as to cause the thread to rub against itself in its passage round the rollers, which it would not be compelled to do were the rollers, or that portion of them where the thread lies, cylindrical. The concave form of the face of the roller causes the convolutions of the thread to slip down to the point of smallest diameter as the tension is applied in either direction, so that the coils of the thread always press against each other.

Another point of improvement consists in mounting the rollers on axes, each of which is at right angles to the one next in the series. The tendency of the thread, as it traverses upon the rollers, is to gradually move toward one end or the other, according to the direction in which it is rotating. By placing the adjacent axes at right angles they tend to correct this tendency in each other, as the deflection caused by thus traversing longitudinally on the roller is at right angles to the axis of the next roller, and, consequently, in a direction in which it cannot yield to accommodate the said deflection. It is thus restrained within limits of oscillation on either side of a central line parallel to the direction of the longitudinal motion.

The pins carrying the rollers, being attached at but one end to the frame, afford a ready means of placing the thread upon the roller.

What I claim as my invention is—

1. In a thread-cleaning machine, the concave-faced rollers C, for the purpose of cleaning and finishing silk and other thread, substantially in the manner herein set forth.

2. A series of rollers placed on axes at right angles to each other, in combination with suitable mechanism for holding them in this position, or nearly so, substantially as and for the purpose herein set forth.

TOBIAS KOHN.

Witnesses:
THEO. G. ELLIS,
JOHN T. PETERS.